(12) United States Patent
Cantos (10) Patent No.: US 9,121,983 B1
(45) Date of Patent: Sep. 1, 2015

(54) RESTRICTING LIGHT LEAKAGE

(75) Inventor: Cornell J. Cantos, Milpitas, CA (US)

(73) Assignee: Amazon Technologies, Inc., Reno, NV (US)

( * ) Notice: Subject to any disclaimer, the term of this patent is extended or adjusted under 35 U.S.C. 154(b) by 280 days.

(21) Appl. No.: 13/612,365

(22) Filed: Sep. 12, 2012

(51) Int. Cl.
*F21V 7/04* (2006.01)
*F21V 8/00* (2006.01)

(52) U.S. Cl.
CPC .............. *G02B 6/005* (2013.01); *G02B 6/0031* (2013.01)

(58) Field of Classification Search
USPC .................. 362/603, 606, 607, 609, 615, 627
See application file for complete search history.

(56) References Cited

U.S. PATENT DOCUMENTS

2011/0277361 A1\* 11/2011 Nichol et al. ................... 40/541

\* cited by examiner

*Primary Examiner* — Meghan Dunwiddie
(74) *Attorney, Agent, or Firm* — Lowenstein Sandler LLP (57) ABSTRACT

A device with a display and a front light guide layer above the display providing illumination for the display, with a light barrier to prevent light leakage from the front light guide layer. A light source introduces light into the front light guide layer, which distributes light evenly throughout itself, and emits light from its edges. A light barrier, such as a foam or epoxy layer, prevents any extraneous light from escaping the device.

18 Claims, 7 Drawing Sheets

RESTRICTING LIGHT LEAKAGE

BACKGROUND

Displays on many industrial, professional and consumer devices include some kind of illumination to enable users to view the display in low light environments. In contrast to back-lit display technology such as liquid crystal display (LCD) panels, reflective displays are not back-lit and depend on light reflecting off the surface to a user, such as electronic paper displays which simulate or closely mimic the appearance of a paper or a printed document. Reflective displays typically do not include their own source of illumination. In reflective display technology, a light source, whether ambient light or other generated light, is on the same side of the reflective display as the user reading or viewing the reflective display.

Thus, if such a display is to be illuminated beyond an ambient level of light, some form of integrated light source emits light above the display layer. Often, the light emitted is so high intensity that light leaks from the edges of the device in to which the display is incorporated, or from seams in a plastic housing of the device. In other scenarios, unwanted light reflects or leaks back towards the display, causing uneven lighting, glare, or other undesirable effects on the display. Such unwanted light leakage can be distracting to a user and detrimental to reading in low light conditions. Thus, such devices are forced to make a tradeoff between either providing a light source for enabling readability in low light situations and dealing with the resulting light leakage and visual distractions, or providing no light source and foregoing the ability to read reflective displays in low light situations.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein are systems and mechanical features for containing light leakage in a display device. While the primary embodiment discussed herein is a reflective display with a front light, one of skill in the art will understand that the same principles for containing light leakage can be applied to other types of displays or other non-display devices in which light is to be contained. A reflective display, such as an electrophoretic display, simulates the appearance of a paper or printed document and, like paper, does not include its own source of illumination. Further, the technology of such reflective displays indicates that a light source, whether ambient light or other generated light, be on the same side of the reflective display as the user reading or viewing the reflective display. One embodiment for illuminating such a reflective display overlays a light guide directly on top of the reflective display or above the reflective display. Other layers, such as a capacitive sensor layer for detecting touch input or an adhesive layer, can reside between the light guide and the reflective display. However, such a light guide can generate light of such intensity that light leaks out the side of the device or other undesired areas. One embodiment for controlling, restricting, reducing, or otherwise mitigating this light leakage involves the inclusion of one or more light barriers where light can leak or is expected to leak.

Reflective displays use incident light to form an image. This incident light may be provided by the sun, general illumination in the room, a reading light, a front light, and so forth. Some example types of reflective displays that may be used with the implementations described herein include bi-stable liquid crystal displays (LCDs), micro-electro-chemical systems (MEMS), electrowetting, cholesteric, interferometric, pigmented electrophoretic, and others. Implementations of a reflective display can include color, black and white, or grayscale electronic paper displays. In general, an electronic paper display or electronic ink display is high resolution (150 dpi or better) and bi-stable, meaning that it is capable of holding text or other rendered images even when very little or no power is supplied to the display. Electronic paper displays may also exhibit high contrast substantially equal to that of printed ink on paper. One specific example electronic paper display that may be used is an E Ink brand display.

An even or uniform field of illumination on the display such as when backlighting a liquid crystal display or frontlighting an electrophoretic display or other reflective display is desirable as this improves the user experience. For example, a non-uniform frontlight or backlight may produce visible bright or dim spots on the display which are distracting to the user.

Figure 1:
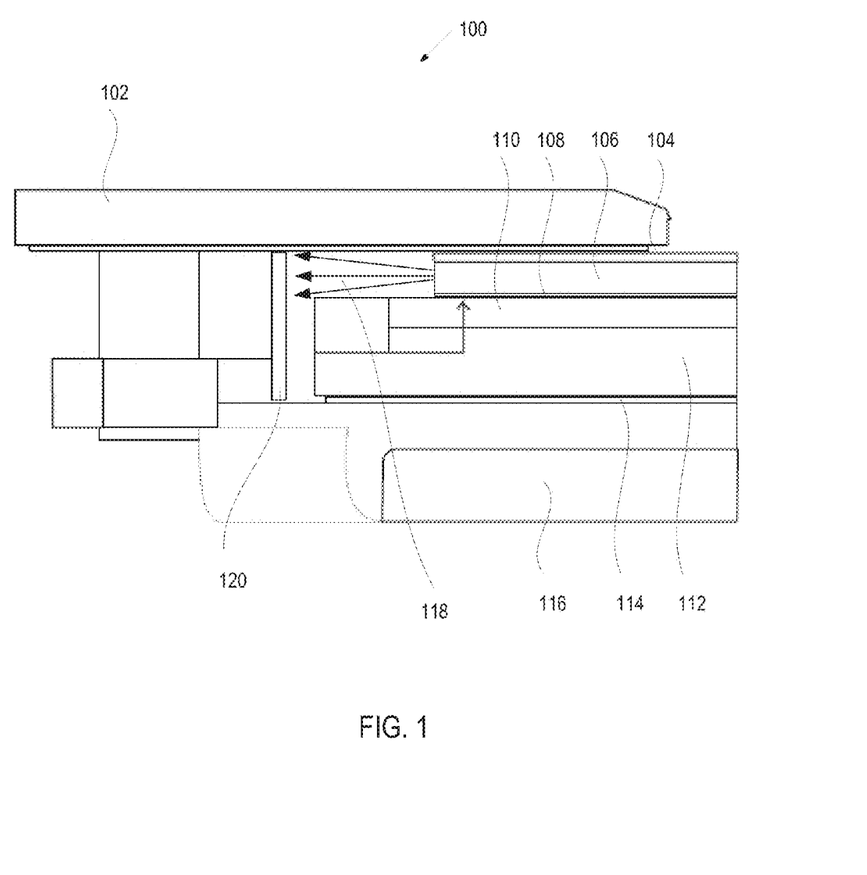
FIG. 1 illustrates a side cutout view of a first example embodiment of a device having front light containment.

FIG. 1 illustrates a side cutout view 100 of a first example embodiment of a device having front light containment. The device can be an eReader or other device that displays content on a reflective display. The side cutout view 100 shows one example configuration of various layers, frames and covers. The exact arrangement and combination of these components is provided as an example, and can include fewer components or other components not shown. In this embodiment, the device includes a front cover 102, which can extend around all or part of a device. For example, the front cover 102 can be part of a bezel around the display so that a user can handle or hold the device without touching a touch-sensitive portion of the device. The front cover 102 can at least partially cover other components. Below the front cover 102 are a light guide film 104 and a light guide 106. The light guide 106 is a 'front light' in that the light is provided to illuminate the underlying reflective display 112 from the front side, as opposed to a backlit liquid crystal display (LCD) panel. The front cover, or bezel, can be separated from layers below by a small gap or space, or the front cover can make direct contact with all or part of the layers below. The light guide 106 can be attached to a light source, such as an integrated LED at one end. The light guide 106 can be constructed to transmit or propagate light evenly throughout the surface of the light guide 106 from one or more light source to illuminate the reflective display 112 below.

The light guide 106 propagates a sheet of light over the reflective display 112. The edges of the light guide 106 are allowed to have light pass through and diffuse into the device's sub-assembly. In other words, the edge of the light guide 106 emits light 118 from the light source into a cavity in the device. The cavity can be entirely or partially enclosed. For example, the cavity can be mostly enclosed, with some openings in to which some light may escape back towards the display. The light 118 is one potential source for light leakage. A light guide silicone layer 108 and an optional touch-sensitive glass layer 110 can be inserted between the light guide 106 and the reflective display 112. A layer of adhesive 114 can attach the layers above to the frame 116.

To reduce or eliminate light leakage, a light barrier 120 stops the light at the cavity. The light barrier can be made of any suitable material or combination of materials having the characteristics to block a sufficient amount of the desired frequencies of light from passing through the light barrier. For example, the light barrier can be a material having an opacity index, light absorption index, light penetration depth, Planck opacity, Rosseland opacity, or other measurement of opacity exceeding a desired threshold. The thickness, color, or other attributes of the light barrier can be configured or selected to provide the desired opacity. The opacity index can be based on known optical material properties or some other measurable scale indicating how opaque a material is for a particular type or intensity of light. For example, one way to quantify the opacity of a particular material is to measure characteristics of a particular intensity and frequency of light passing or attempting to pass through a material segment of a particular thickness. These types of measurements can be performed for a range of intensities and light frequencies. For example, the opacity of a foam material can be measured by emitting orange light with a wavelength of 600 nm, at an intensity or radiant power of 2 Watts and at a distance of 1 cm through a 10 mm thick section of the foam material, and measuring the intensity of any light passing through the foam material. Then the opacity index can be based on a ratio of the intensity at the source and the intensity after passing through the foam. This specific example embodiment is illustrative, and other measurements, thicknesses, types of light, ratios and so forth can be used to calculate the opacity index for a particular material. Some example materials for the light barrier 120 include soft, compressible, or rigid foam, tinted or otherwise treated glass, a composite material, metal, paper, cardboard, plastic, acrylic, resin, wood, mineral, fiberglass, or any other material having an opacity index above a desired threshold or within a desired range. The light barrier can be a solid component of varying density. The light barrier can also be a compartment containing unconnected objects, such as a cavity containing pellets or beads which deflect, scatter, absorb, or reflect light. Foam light barriers can include solid foams that are either open celled or closed celled. Open celled foam is porous, whereas closed cell foams do not have interconnected pores. The foam can be constructed from materials such as polystyrene, polypropylene, urethane, polyurethane, Styrofoam, polyethylene, silicone, rubber and so forth. The light barrier 120 can be a combination of two or more materials, such as metal covered in foam, foam having embedded fiberglass fibers, or a blended composite material made of rubber and polyurethane. The desired threshold or the range can be determined based on the type, intensity, frequency, characteristics of light generated by the light source emitting into the light track, or characteristics of light that the light track is likely to emit at a particular location.

The light barrier 120 can take the shape of a 'wall' that is vertical in relation to the light guide 106, or perpendicular to a direction of light transmitted from the light guide 106. The light barrier 120 can have straight or flat edges or custom shaped edges to match specific contours of the various components of the device in to which the light barrier 120 comes in to contact. The light barrier 120 can be solid or can include holes, ridges, notches, dimples, or other spatial features which can absorb or deflect light away from potential problem areas for light leakage. For example, if a particular device design has a region where light leakage is more likely, the shape of the light barrier 120 can be changed to reflect or absorb more light at that region, the thickness of the light barrier 120 can be increased at that region, an additional light barrier can be introduced at that region, or the material used to construct the light barrier 120 can change at that region. For example, if the light barrier 120 is a foam band, a reflective strip can be affixed to the inside or outside of the light barrier at the region where light leakage is more likely. Similarly, the entire light barrier 120 can be light reflecting, light deflecting, light absorbing, or otherwise light impenetrable. The light barrier 120 can be designed to match interfacing recesses between the frame 116 and the front cover 102 to trap all light within the device.

The light barrier 120 can be completely or partially opaque to visible light. The light barrier 120 can be opaque to non-visible light, such as light in ultraviolet or infrared frequencies. However, because light leakage at those frequencies is not a problem for human eyes, blocking those frequencies is relatively unimportant in most, but not all, implementations. In other embodiments in which light leakage in such frequencies should be blocked, the light barrier 120 can be modified or an additional light barrier can be introduced for a particular frequency. In one embodiment, the light barrier 120 is replaceable or interchangeable.

The light barrier 120 blocks all or part of the light 118 emitted from the side of the light guide 106 from escaping outside the device. The size and shape of the cavity in to which the light 118 is emitted can vary in thickness, height and so forth in different positions around the edge of the device.

Figure 2:
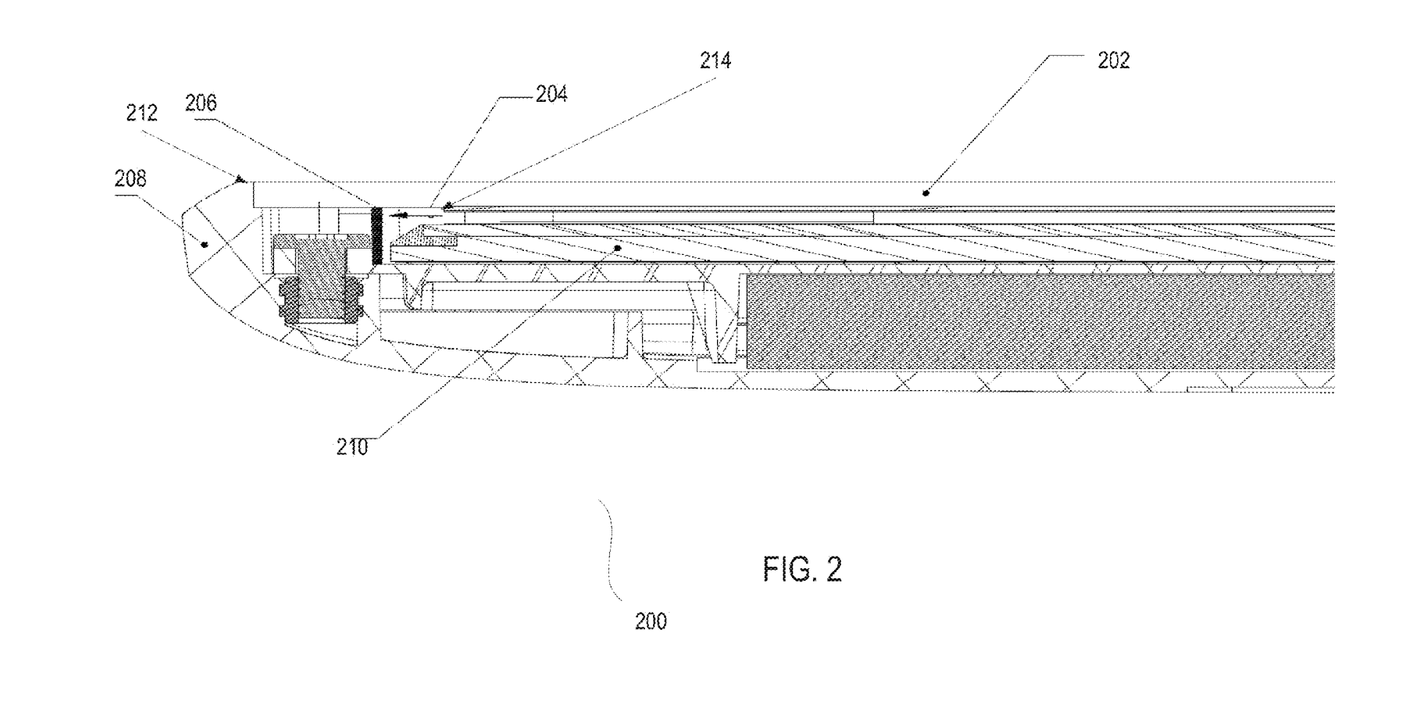
FIG. 2 illustrates a side cutout view of a second example embodiment of a device having front light containment.

FIG. 2 illustrates a side cutout view 200 of a second example embodiment of front light containment via a light barrier 206 as integrated into an external cover 208 of a device. In this embodiment, the front bezel 202 extends around at least a portion of a front light and display subassembly 210 that includes at least a reflective display and a light guide over the reflective display, but which can also include other adhesive layers, a touch layer, glass layers, insulating layers and so forth. An affixed or removable light source emits light into the light guide of the front light and display subassembly 210. The light from the light source travels through the light guide of the front light and display subassembly 210 and into the cavity 204. The light barrier 206 blocks all or part of the light emitted into the cavity. The light barrier 206 can prevent light leakage at potential light leakage spots, such as a bezel boundary 212 where the bezel 202 interfaces with the external cover 208. In another scenario, the light barrier 206 can absorb, deflect, or reflect light away from returning backwards through a gap 214 that may exist between the bezel 202 and the display subassembly 210. The light barrier 206 can prevent light from leaking back towards the display in order to avoid uneven or unwanted lighting of the display.

Figure 3:
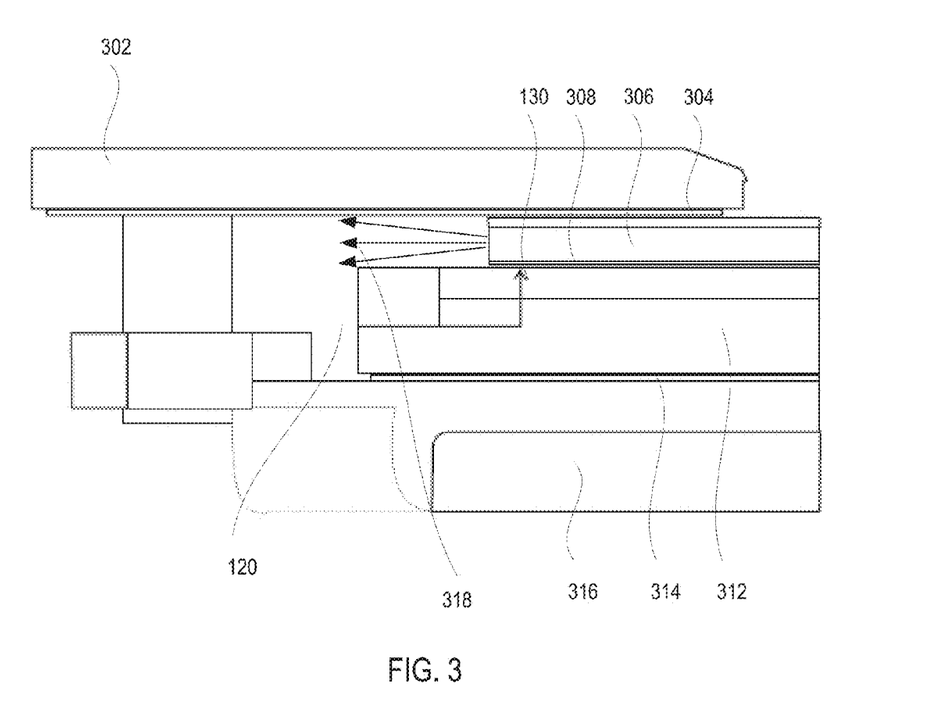
FIG. 3 illustrates a side cutout view of a device without front light containment.

FIG. 3 illustrates a side cutout view 300 of a device without front light containment. The side cutout view 300 shows one example configuration of various layers, frames and covers that generally corresponds to the configuration shown in FIG. 1. In this embodiment, the device includes a front cover 302, which can extend around all or part of a device. The front cover 302 can at least partially cover other components, such as a light guide film 304 and a light guide 306. The light guide 306 can be attached to a light source, such as an integrated LED at one end. The light guide 306 can be constructed to propagate light evenly throughout the surface of the light guide 306 from one or more light source to illuminate the reflective display 312 below. The edge of the light guide 306 emits light 318 from the light source into a cavity in the device. The light 318 is one potential source for light leakage. A light guide silicone layer 308 and an optional touch-sensitive glass layer 310 can be inserted between the light guide 306 and the reflective display 312. A layer of adhesive 314 can attach the layers above to the frame 316. Without the light barrier 120 of FIG. 1, the light 318 emitted from the side of the light guide 306 can leak out through the side, top, bottom, back out under the front cover 302, or other surface of the device, such as a seam between outer cover panels. In many mass manufactured devices, the front cover 302, or bezel, does not lay perfectly flush against the uppermost layer, in this case the light guide film 304, so light can also escape back out under the front cover 302 if the front cover 302 is not properly seated and bonded.

Figure 4:
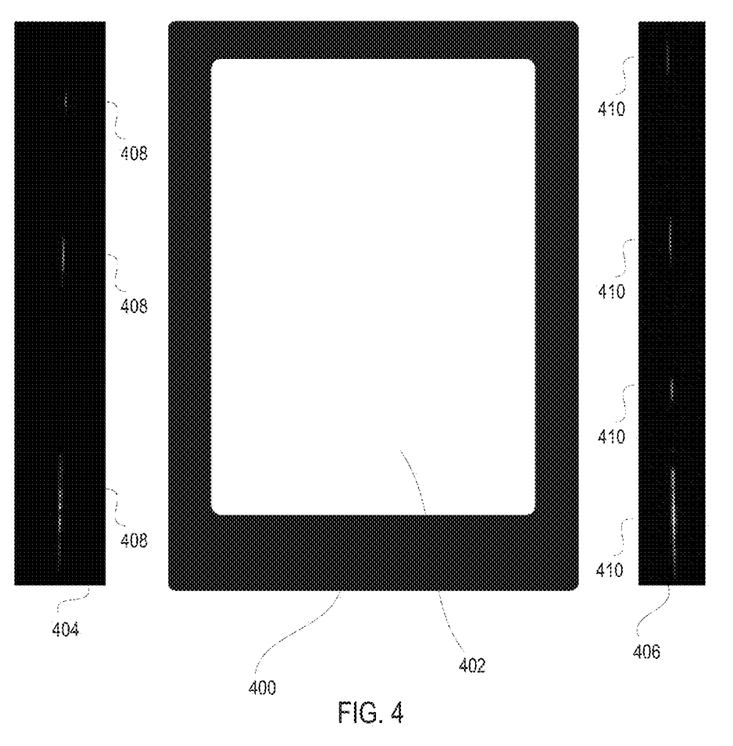
FIG. 4 illustrates example light leakage of the device of FIG. 3.

FIG. 4 illustrates example light leakage of the device 400 of FIG. 3. The various layers shown in FIG. 3 are part of the display 402 of the device 400. The left view 404 of the device 400 shows three locations 408 at which light leaks out of the device when the light source is emitting into the light guide 306. Similarly, the right view 406 shows four locations 410 at which light leaks out of the device. Due to tolerances and variances in the manufacturing process, the type, location and severity of light leakage locations can vary from device to device without a light barrier 120.

Figure 5:
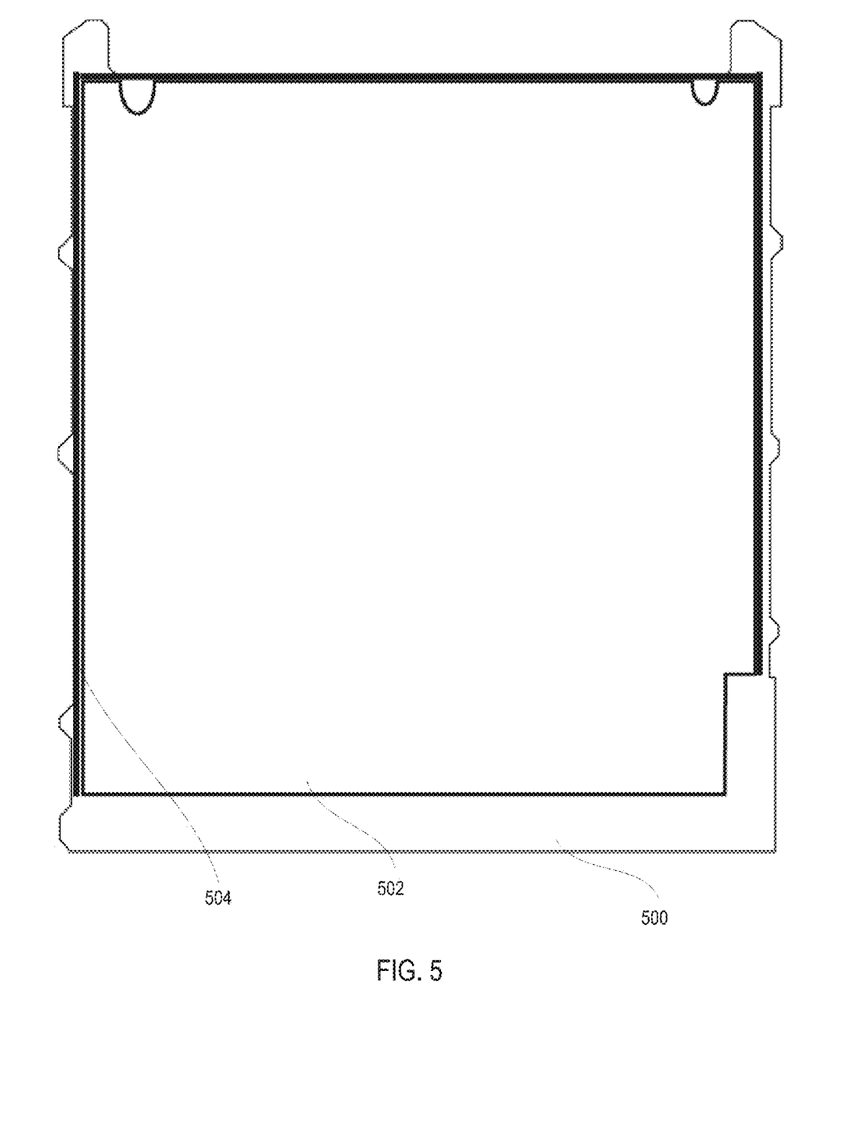
FIG. 5 illustrates a top view of an example embodiment of a device having front light containment via a continuous light barrier.

FIG. 5 illustrates a top view of an example embodiment of a device having front light containment via a continuous light barrier. A front light and display panel 502 is attached to a main board 500 that houses the front light and display panel 502. In this embodiment, the light barrier 504, represented by the thick black line, extends continuously around the entire perimeter of the front light and display panel 502. The light barrier 504 can be composed of various panels, such as one panel for each side of the front light and display panel 502, or can be composed of a single panel constructed to the appropriate shape.

Figure 6:
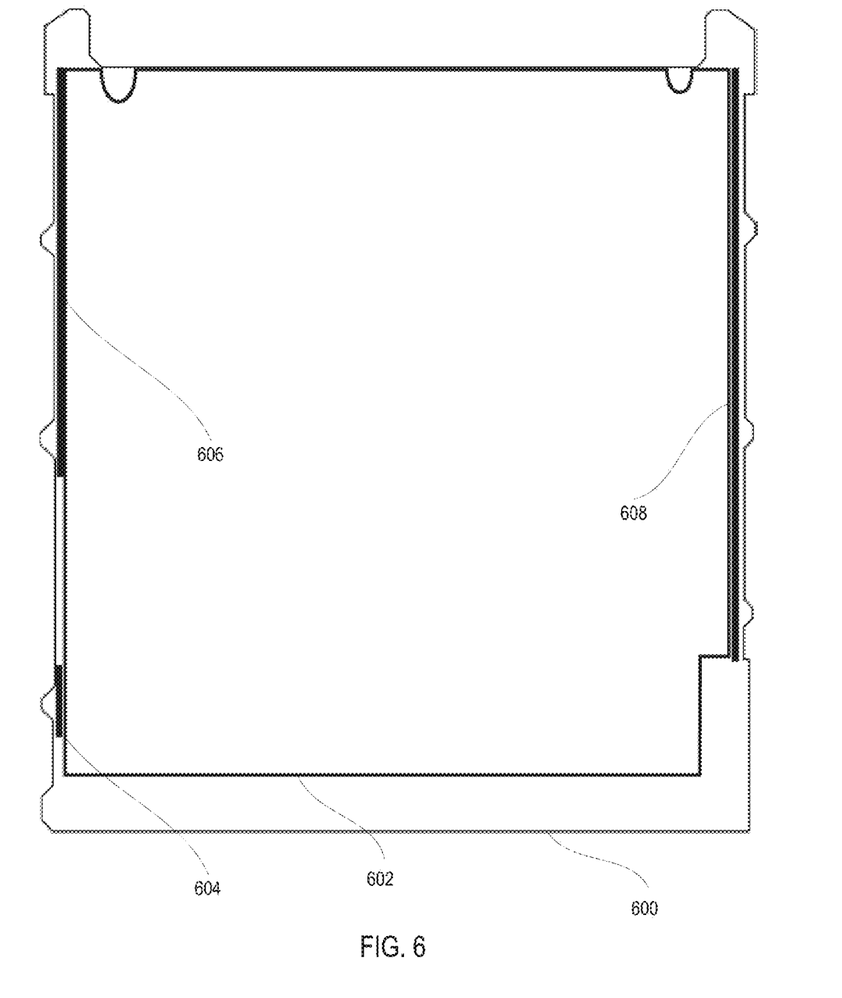
FIG. 6 illustrates a top view of an example embodiment of a device having front light containment via a set of light barriers.

In another embodiment, the light barrier includes multiple, non-contiguous pieces constructed to block light only at specific sections of the perimeter. FIG. 6 illustrates a top view of an example embodiment of a device having front light containment via a set of light barriers. A front light and display panel 602 is attached to a main board 600 that houses the front light and display panel 602. In this embodiment, three separate light barriers 604, 606, 608, represented by the thick black line, block light at specific areas of the perimeter of the front light and display panel 602. The size, thickness, material and other attributes of the light barriers 604, 606, 608 can differ for each location. For example, light barrier 604, because of its position near a light source emitting into the light guide and the resultant higher intensity light from the edge of the light guide, may be twice as thick as light barrier 606 which is farther away from the light source and where the light emitted from the edge of the light guide is of a lower intensity. Similarly, if the light distribution characteristics of the light guide provide more light on one side than the other side, the light barrier 608 on that side can be constructed, such as with specific shapes and a reflective surface, to provide directional reflections of the light back into the light guide to illuminate the display. In one embodiment, the light barrier is 0.30 mm thick foam along one edge of the front light, and 1.50 mm thick foam along another edge of the front light. Further, the light barrier can have various characteristics, such as torsion, pliancy, flexibility, rigidity, thickness, and so forth. The light barrier can be manufactured to range of tolerances, so that the physical and opacity characteristics of the light barrier are uniform within the range of tolerances.

Figure 7:
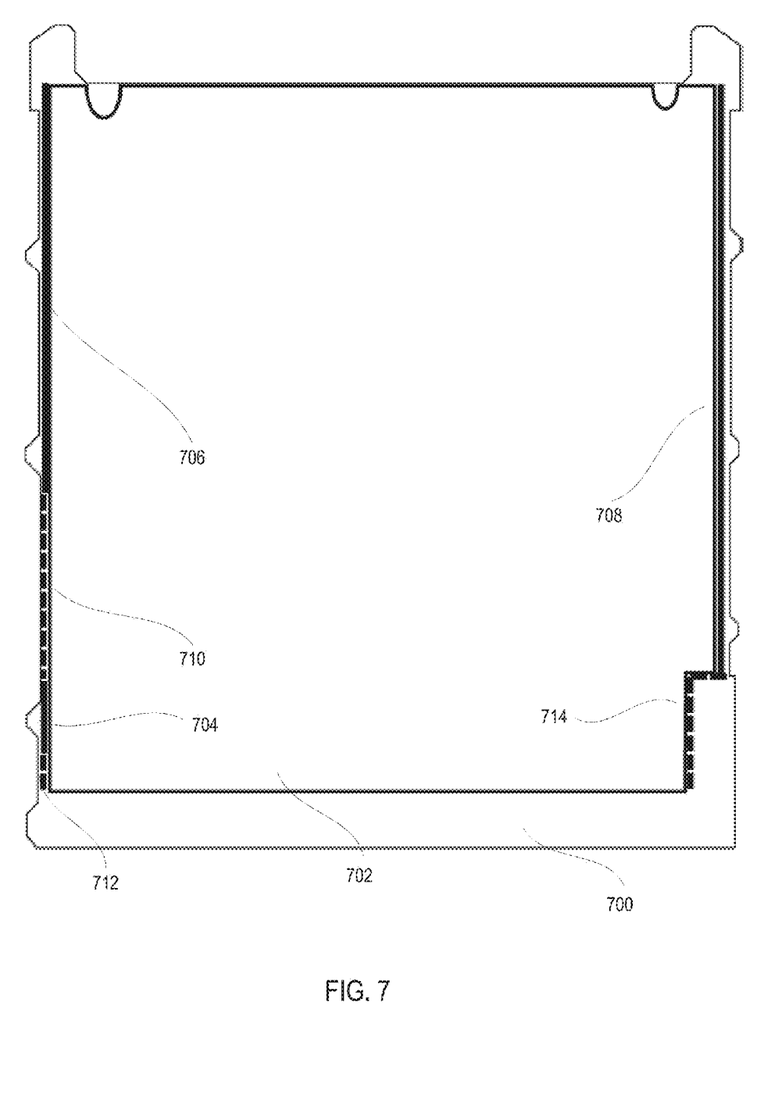
FIG. 7 illustrates a top view of an example embodiment of a device having front light containment via a combination of light barriers and epoxy.

FIG. 7 illustrates a top view of an example embodiment of a device having front light containment via a combination of light barriers and epoxy. A front light and display panel 702 is attached to a main board 700 that houses the front light and display panel 702. In this embodiment, three separate foam light barriers 704, 706, 708, represented by the thick black solid line, block light at specific areas of the perimeter of the front light and display panel 702. Three separate epoxy light barriers 710, 712, 714, represented by the thick black dashed line, block light at other areas of the perimeter of the front light and display panel 702. The epoxy light barriers 710, 712, 714 can overlap with all or part of the foam light barriers 704, 706, 708, but may not overlap at all. The thickness of the epoxy layer, as well as the composition of the epoxy for light barriers 710, 712, 714 can differ for each location. The epoxy can be applied directly to the edge of the front light and display panel 702, or directly to the light guide layer. Alternately, the epoxy can be used as adhesive to affix the front light and display panel 702 to the main board 700, for example. The epoxy light barriers 710, 712, 714 can be applied to regions where light leakage is a known potential problem as a more robust solution, while the foam light barriers 704, 706, 708 are used in other regions as a lower cost solution, as an easier to assemble solution, or as a way to provide some other manufacturing benefit where light leakage is a less likely problem.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A device comprising:
   a reflective display;
   a light source;
   a light guide layer optically coupled to the light source, and above the reflective display, wherein the light guide layer propagates light emitted from the light source for illuminating the reflective display; and
   a cavity between the light guide layer and a non-reflective light barrier, wherein at least a portion of the light guide layer forms at least part of a first wall of the cavity and the light barrier forms at least part of a second wall of the cavity, wherein the light barrier prevents light propagated from the light guide layer into the cavity from escaping the cavity.

2. The device of claim 1, further comprising at least one of an adhesive layer or a capacitive sensor layer between the reflective display and the light guide layer.

3. The device of claim 1, wherein the light guide layer propagates light from the light source into the cavity.

4. An apparatus comprising:
an outer cover;
a light source coupled to a front light layer above a display, wherein the front light layer propagates light from the light source into a cavity within the outer cover;
a first light barrier adjacent to a first portion of the cavity; and
a second light barrier adjacent to a second portion of the cavity, wherein the first light barrier and the second light barrier have different opacity characteristics, and wherein the first light barrier and the second light barrier prevent light propagated from the front light layer into the cavity from escaping at least a portion of the cavity.

5. The display device of claim 4, further comprising:
a bezel forming at least part of a third wall of the cavity.

6. The display device of claim 4, wherein the first light barrier is compressible foam.

7. The display device of claim 4, wherein the first light barrier is compressible foam, and the second light barrier is epoxy.

8. The display device of claim 7, wherein the epoxy is affixed to the front light layer.

9. The display device of claim 4, wherein the display is a reflective display.

10. The display device of claim 4, wherein the first light barrier and the second light barrier are adjacent to each other to provide a continuous light barrier along at least a portion of the cavity.

11. The display device of claim 4, wherein the first light barrier and the second light barrier form a light barrier for at least a portion of a light-emitting edge of the front light layer.

12. The display device of claim 4, wherein a thickness at a position of at least one of the first light barrier or the second light barrier is based on an expected light intensity at the position.

13. A system comprising:
a light source coupled to a front light layer above a display, wherein the front light layer propagates light from the light source into a cavity; and
a non-reflective light barrier blocking light propagated into the cavity, so that at least a threshold amount of light propagated by the front light layer into the cavity does not escape from a portion of the cavity.

14. The system of claim 13, wherein the light barrier comprises at least one of soft foam, compressible foam, rigid foam, tinted glass, treated glass, a composite material, metal, paper, cardboard, plastic, wood, or fiberglass.

15. The system of claim 13, wherein the light barrier has an opacity index within a desired range.

16. The system of claim 13, wherein the light barrier is a wall perpendicular to a direction of light propagated from the front light layer.

17. The system of claim 13, wherein the light barrier is shaped to match contours of the cavity.

18. The system of claim 13, wherein the light barrier blocks human visible light propagated from the front light layer.

* * * * *